United States Patent Office 3,499,909
Patented Mar. 10, 1970

3,499,909
PROCESS FOR PRODUCTION OF
6-AMINOPENICILLANIC ACID
Helmut Wilhelm Otto Weissenburger, Rijswijk, and Marcelus Gijsbertus van der Hoeven, Den Haag, Netherlands, assignors to Koninklijke Nederlandsche Gist- en Spiritusfabriek N.V., Delft, Netherlands, a corporation of the Netherlands
No Drawing. Continuation-in-part of application Ser. No. 622,907, Mar. 14, 1967. This application Nov. 6, 1967, Ser. No. 681,002
Claims priority, application Netherlands, May 18, 1966, 6606872; Aug. 7, 1967, 6710835; Oct. 11, 1967, 6713809
Int. Cl. C07d 91/14
U.S. Cl. 260—306.7                 10 Claims

ABSTRACT OF THE DISCLOSURE

A novel process for the preparation of a compound selected from the group consisting of 6-amino-penicillanic acid and its derivatives and 7-amino-cephalosporanic acid and its derivatives in high yields by chemical removal of the acyl radical of the corresponding 6-acylamino-penicillanic or 7-acylamino-cephalosporanic compounds which are useful intermediates.

PRIOR APPLICATION

The present application is a continuation-in-part application of our copending, commonly assigned United States application Ser. No. 622,907, filed Mar. 14, 1967, now abandoned.

PRIOR ART

Nature (vol. 195, 1962, p. 1000) discloses that alkaline hydrolysis of penicillins results in the formation of the corresponding penicilloic acids. With certain penicillins, alkaline hydrolysis may also split off the side chain and under certain conditions up to 1% of these penicillins may be converted into 6-amino-penicillanic acid. For example, storage of a 1% solution of phenoxymethyl-penicillanic acid in a 0.05 molar phosphate buffer solution at a pH of 8.5 and 70° C. results in a 0.5% yield of 6-amino-penicillanic acid. Benzyl-penicillin treated in the same way results in a yield of less than 0.03% 6-amino-penicillanic acid.

6-amino-penicillanic acid has been prepared by microbiological methods up to the present, but these methods suffer certain disadvantages since infection may occur with penicillinase-forming organisms which break the penicillin down into penicilloic acids. Therefore, continuous commercial production thereof is not feasible. Moreover, it is necessary to work in very dilute solutions and the 6-amino-penicillanic acid formed must be separated from large amounts of water which contain foreign substances, due to the microbiological conversion, particularly enzymes and other proteins, which have to be removed to avoid contamination of the 6-amino-penicillanic acid.

U.S. Patent No. 2,746,956 discloses silyl esters of penicillin which change undesirable properties thereof without affecting the biological properties.

Dutch patent specifications No. 6401421 and No. 6531095 describe a preparation of 7-amino-cephalosporanic acid which comprises (A) protecting the free amino and carboxylic acid groups of cephalosporin C of the formula

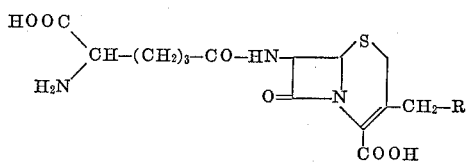

wherein R is acyloxy such as acetoxy or forms a lactone with the 2-carboxyl group, preferably by converting cephalosporin C into the di-benzhydryl ester of N-phthal-oyl-cephalosporin C, (B) converting the said protected product into an amino halide, preferably by reaction with a halogenating agent such as phosphorus pentachloride or phosphorus oxychloride in the presence of a tertiary amine such as triethylamine, pyridine or dimethylaniline, (C) reacting the imino halide with an alcohol such as methanol or ethanol to form the corresponding imino ether and (D) hydrolyzing the imino ether with water in the presence of a basic or acidic catalyst such as phosphoric acid or hydrochloric acid to form the corresponding carboxylic acid esters of 7-aminocephalosporanic acid.

If the carboxylic acid groups of cephalosporin C had been esterified, for instance, with benzyl or benzhydryl groups respectively, the benzyl ester and the benzhydryl ester of 7-aminocephalosporanic acid are obtained, from which the benzyl group can be removed by hydrogenolysis and the benzhydryl group by treatment with trifluoroacetic acid in anisole.

According to the Dutch patent specification No. 6,513,095 after the saponification of the benzhydryl ester of 7-amino-cephalosporanic acid, trifluoroacetic acid is then further converted in a polar solvent with a tertiary amine into the trifluoroacetate, and 7-amino-cephalosporanic acid is crystallized from the solution.

OBJECTS OF THE INVENTION

It is an object of the invention to provide a novel process for the preparation of 6-amino-penicillanic acid and 7-amino-cephalosporanic acid and their derivatives in high yields and without the disadvantages of microbiological processes.

It is another object of the invention to provide an improved process for the preparation of 6-amino-penicillanic acid and 7-amino-cephalosporanic acid and their derivatives with few steps and higher yields due to the operating conditions.

These and other objects and advantages of the invention will become obvious from the following detailed description.

THE INVENTION

The novel process of the invention for the preparation of an amino acid selected from the group consisting of 6-amino-penicillanic acid and 7-amino-cephalosporanic acid and its derivatives comprises, (A) reacting an acyl amino acid compound of a formula selected from the group consisting of

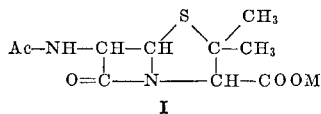

and

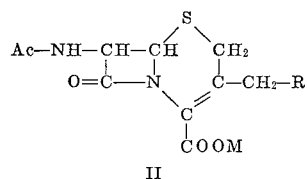

wherein AC is the acyl of an organic carboxylic acid of 1 to 18 carbon atoms, R is selected from the group consisting of acyloxy of an organic carboxylic acid of 1 to 7 carbon atoms, OH and H, M is selected from the group consisting of hydrogen, metal salts and amine salts with a silyl compound of a formula selected from the group consisting of

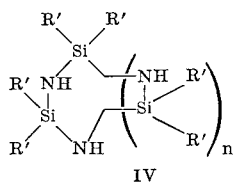 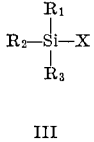

wherein $R_1$, $R_2$ and $R_3$ are selected from the group consisting of hydrogen, halogen, alkyl and haloalkyl of 1 to 7 carbon atoms and aryl, at least one of the said R's being other than halogen and hydrogen, R' is alkyl of 1 to 7 carbon atoms, $n$ is an integer from 1 to 2 and X is selected from the group consisting of halogen and

and $R_4$ is selected from the group consisting of hydrogen and alkyl of 1 to 7 carbon atoms and $R_5$ is selected from the group consisting of hydrogen, alkyl of 1 to 7 carbon atoms and

to form the corresponding silyl ester of the said acylamino acid, (B) reacting the said silyl ester with a halogenating agent to form the corresponding amino halide, (C) reacting the said imino halide with an alcohol selected from the group consisting of aliphatic alcohols of 1 to 12 carbon atoms and phenylalkyl alcohols having 0 to 7 alkyl carbon atoms to form the corresponding imino ether, reaction B being preferably effected at temperatures below 0° C. and reaction C being preferably effected at —20° to —60° C., and (D) reacting the imino ether under acid conditions with a compound selected from the group consisting of water and a hydroxyl containing compound which simultaneously splits the double imino bond and hydrolyzes the silyl ester to form the corresponding free amino acid.

The process of the invention unexpectedly gives high yields which may be of the order of 85% to 95% which is due to the use of silyl esters which may be prepared and converted without loss of material, especially if the reaction proceeds at the unusually low temperatures of below —20° C., preferably —20° to —60° C., during formation of the imino ether. This prevents splitting of the lactam bond. Moreover, the use of the silyl esters rather than the esters of Dutch patent specifications No. 6401421 and No. 6531095 simplifies the process since the silyl ester hydrolyzes simultaneously with the splitting of the double imino bond and avoids the separate step of splitting the 2-carboxylic acid ester required by the known process.

The formation of the silyl ester is effected by reacting under anhydrous conditions a silyl compound of Formula III or IV with the free acylamino acid of Formula I or II or a salt thereof in the presence of an acid binding agent. Examples of suitable salts are alkali metal and alkaline earth metal salts such as potassium, sodium, calcium, etc.; ammonium salt, metal salts such as aluminum; amine salts such as trialkyl amines such as triethylamine, procasine, dibenzylamine, N-benzyl-β-phenethylamine, 1-ephenamine, N,N' - dibenzylethylenediamine, dehydroabiethylamine, N-lower alkyl-piperidines such as N-ethylpiperidine, N-benzyl-dehydroabiethylamine, etc. Preferably tertiary amine salts are used.

Examples of suitable acid binding agents are tertiary amines such as triethylamine, dimethylaniline, quinoline, lutidine, pyridine. The amount of tertiary amine used is preferably such that only a portion of the acid thus formed is bound. For example, the amount of tertiary amine for $PCl_5$ and a small excess of acid forming halogeno-silane derivative may be less than four equivalents, preferably less than three equivalents, whereby no separate hydrolysis is required.

Examples of suitable silyl compounds of Formula I are trimethyl chlorosilane, hexamethyl disilazane, triethyl chlorosilane, methyl trichlorosilane, dimethyl dichlorosilane, triethyl bromosilane, tri-n-propyl chlorosilane, bromomethyl dimethyl chlorosilane, tri-n-butyl chlorosilane, methyl diethyl chlorosilane, dimethyl ethyl chlorosilane, phenyl dimethyl bromosilane, benzyl methyl ethyl chlorosilane, phenyl ethyl methyl chlorosilane, triphenylchlorosilane, triphenyl fluorosilane, tri-o-tolyl chlorosilane, tri-p-dimethylaminophenyl chlorosilane, N-ethyl triethylsilylamine, hexaethyl disilazane, triphenyl silylamine, tri-n-propyl silylamine, tetraethyl dimethyl disilazane, tetramethyl diethyl disilazane, tetramethyl diphenyl disilazane, hexaphenyl disilazane, hexa-p-tolyl disilazane. etc. The same effect is produced by hexa-alkylcyclotrisilazanes or octaalkylcyclotetrasilazanes. Other suitable silylating agents are silylamides and silylureides such as a trialkylsilylacetamide and a bis-trialkylsilylacetamide.

The imino compound is preferably an imino chloride or bromide which can be prepared by reacting the silyl ester of the acylamino acid with a halogenating agent such as phosphorus pentachloride, phosphorus pentabromide, phosphorus tribromide, oxalyl chloride, p-toluene sulfonic acid chloride, phosphorus oxychloride, phosgene, etc., under anhydrous conditions in the presence of acid binding agents at temperatures preferably below 0° C. such as —10 to —40° C. The formation of the imino halide is preferably effected in an inert organic solvent such as methylene chloride, dichloroethane, chloroform, tetrachloroethane, nitromethane, diethyl ether, etc.

A very important step for the high yields of the process of the invention is the formation of the imino ether by reacting the imino halide under anhydrous conditions with a primary or secondary alcohol at temperatures between —20 and —60° C., preferably about —40° C. Temperatures higher than —20° C. give a substantial reduction in yield, i.e., 15% or more at temperatures about 0° C. with penicillin G.

Examples of suitable alcohols for forming the imino ethers are primary and secondary alcohols having the general formula $R_6OH$ in which $R_6$ is selected from the group consisting of (A) alkyl, having 1 to 12 carbon atoms, preferably at least 3 carbon atoms, such as methanol, ethanol, propanol, isopropanol, n-butanol, amylalcohol, decanol, etc.; (B) phenylalkyl having 1 to 7 alkyl atoms, such as benzylalcohol, 2-phenylethanol-1, etc.; (C) cycloalkyl, such as cyclohexylalcohol, etc.; (D) hydroxyalkyl having 2 to 12 carbon atoms, preferably at least 3 carbon atoms, such as 1.6 hexanediol, etc.; (E) alkoxyalkyl having 3 to 12 carbon atoms, such as 2-methoxyethanol, 2-isopropoxyethanol, 2-butoxyethanol, etc.; (F) aryloxyalkyl, having 2 to 7 carbon atoms in the aliphatic chain such as 2-p-chlorophenoxyethanol, etc.; (G) aralkoxyalkyl, having 3 to 7 carbon atoms in the aliphatic chain, such as 2-(p-methoxybenzyloxy)-ethanol, etc.; (H) hydroxyalkoxyalkyl, having 4 to 7 carbon atoms, such as diglycol. Also, mixtures of these alcohols are suitable for forming the imino ethers.

Of the imino ether forms, the imino bond must finally be split, e.g. by mild hydrolysis or alcoholysis, especially if an exces of alcohol is used and hydrogen ions are present, for instance by use of less acid binder than is theoretically necessary for the binding of the acid liberated.

The separation of the free amino acid formed is effected by bringing the reaction mixture to, or in the vicinity of, the isoelectric point, in consequence of which crystallization takes place. The 6-amino-penicillanic acid obtained according to the present process in general has a content of 96–99%, so that recrystallization then is not necessary.

For optimum results, it is preferred to use high concentrations of the reactants. For example, in the formation of the silyl esters, a 20 to 30%, preferably 25% by weight of the acylamino acid is suspended in an inert organic solvent and a base for the best results. The preferred base is dimethylaniline. Depending upon the specific starting material, the silane is employed preferably in a slight excess i.e. 10 to 60%, above theoretical amounts. This enables the use of solvents which are not absolutely dry because trace amounts of water are removed therefrom by reacting with the excess silylating agent. If there are additional carboxyl groups present in the acyl chain of the starting material, additional silane will be needed to esterify the said carboxyl groups.

The reaction scheme is illustrated with 6-amino-penicillanic acid in Table I.

TABLE I

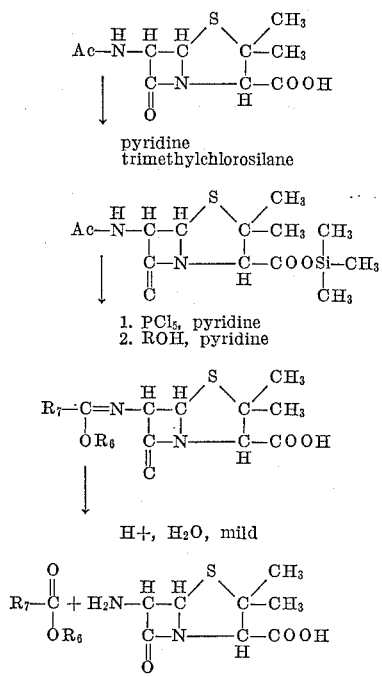

wherein $R_6$ is selected from the group consisting of alkyl, hydroxyalkyl and phenylalkyl and $R_7CO$ is the same as Ac, and Ac is the acyl radical of an organic carboxylic acid of 1 to 18 carbon atoms.

Examples of suitable 6-acylamino-penicillanic acid are penicillin G, penicillin F, penicillin K, penicillin N, penicillin V, penicillin O, penicillin S, penicillin X, etc. Other known penicillins are disclosed in U.S. Patents Nos. 2,941,995; 2,951,839; 2,996,501; 3,007,920; 3,025,290; 3,035,047; 3,040,032; 3,040,033; 3,041,332; 3,041,333; 3,043,831; 3,053,831; 3,071,575; 3,071,576; 3,082,204; 3,093,547 and 3,093,633.

Examples of suitable sephalosporanic compounds suitable for the preparation of 7-amino-cephalosporanic acid are cephalosporin C, cephalothin, N-phenylacetyl-3-desacetoxy - 7 - amino-cephalosporanic acid, etc. Other compounds are disclosed in U.S. Patents 3,093,638 and 3,207,755 and British Patent No. 1,041,985, etc.

Examples of suitable organic carboxylic acids for the acylamino acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids, such as undecylenic acid and oleic acid; cycloalkyl carboxylic acids, such as cyclopentyl carboxylic acid, cyclopropyl carboxylic acid, cyclobutyl carboxylic acid and cyclohexyl carboxylic acid; cycloalkyl alkanoic acids, such as cyclopentyl acetic acid, cyclohexyl acetic acid, cyclopentyl propionic acid and cyclohexyl propionic acid; arylalkanoic acids, such as phenyl acetic acid and phenyl propionic acid; aryl carboxylic acids, such as benzoic acid and 2,4-dinitrobenzoic acid; phenoxy alkanoic acids, such as phenoxy acetic acid, p-chlorophenoxy acetic acid, 2,4-dichlorophenoxy acetic acid, 4-terbutylphenoxy acetic acid, 3-phenoxy propionic acid and 4-phenoxy butyric acid; heterocyclic carboxylic acids, such as furane-2-carboxylic acid, 5-terbutylfurane-2-carboxylic acid, 5-bromofurane-2-carboxylic acid and nicotinic acids; β-ketoalkanoic acids, such as acetylacetic acid, propionylacetic acid and butyrylacetic acid; amino acids, such as diethylaminoacetic acid and aspartic acid.

In the following examples there are described several preferred embodiments to illustrate the invention.

EXAMPLE I 2.51 g. of the sodium salt of cephalothin in 35 ml. of methylene chloride to which 1.60 ml. of dimethylaniline had been added is reacted with 0.6 ml. of dimethyldichlorosilane to form the dimethylsilyl esters of cephalothin. After cooling of the resulting solution to about −55° C., 1.35 g. of PCl₅ were added during which the temperature rose to −40° C. The temperature is kept at −40° C. for 2¼ hours after which the mixture was cooled to −70° C. Then 0.30 ml. of dimethylaniline was added thereto followed by the addition of 15 ml. of butanol over about 1½ minutes. The temperature was kept at −40° C. After about 2½ hours, the reaction mixture was poured into a mixture of 33 ml. of water and 16.5 ml. of methanol, after which the pH of the mixture was brought to 3.5 by the addition of ammonium bicarbonate. After about 20 hours storage at 5° C., the precipitate was filtered off. Purification of the product was effected by dissolution in water at a pH of 7.3 and treatment with active carbon. After filtration 1.5 times volume of methanol was added to the aqueous solution after which the pH was brought to 3.5 by addition of 4 N hydrochloric acid. The crystalline product was filtered off after 2 hours' storage at about 5° C. to obtain 1.51 gm. (92.5% yield) of 7-amino-cephalosporanic acid.

EXAMPLE II 1.1 ml. of triethylamine, 3.15 ml. of trimethylmonochlorosilane and 6.7 ml. of dimethylaniline were added with stirring to 3.12 g. of anhydrous cephalosporin C suspended in 42 ml. of methylene chloride. After a reaction time of 1 hour, the mixture was cooled to about −60° C., after which 3.3 g. of phosphorus pentachloride were added with thorough stirring. The temperature then rose to about −40° C. After 2½ hours reaction at this temperature, the mixture was cooled to about −70° C. and 0.4 ml. of dimethylaniline and 30 ml. of n-butanol were rapidly added with stirring during which the temperature rose. The temperature was held at −40° C. for 2½ hours. Then the reaction mixture was poured with thorough stirring into a mixture of 33 ml. of water and 16.5 ml. of methanol after which the pH of the mixture was brought at once to 3.5 by addition of ammonium bicarbonate.

After about 20 hours' storage at 5° C., the precipitate was filtered off and washed with methylene chloride and acetone.

The purification of the product was effected by dissolution in water at a pH of 7.3 and treatment with active carbon. After filtration, 1.5 times by volume of methanol was added to the aqueous solution after which the pH was brought to 3.5 with the aid of 4 N hydrochloric acid. After 2 hours' storage at about 5° C., the crystalline product was filtered off to obtain 1.86 gm. (91% yield) of 7-amino-cephalosporanic acid.

EXAMPLE III 2.80 g. of N-phthaloyl-cephalosporin C were suspended in 40 ml. of methylene chloride and 3.2 ml. of a 20% by weight solution of triethylamine in methylene chloride and 2.85 ml. of dimethylaniline were added thereto. The substantially clear solution was reacted with 0.6 ml. of dimethyldichlorosilane to form the corresponding silyl ester. After a reaction time of 1 hour, the mixture was cooled to −50° C. and 1.4 g. of $PCl_5$ were added. With continued thorough stirring, the temperature was held for 2¼ hours at −40° C. and then the mixture was cooled to −65° C. Then a mixture of 0.2 ml. of dimethylaniline and 25 ml. of n-butanol was rapidly added thereto. The temperature was subsequently held for 2 hours at −40° C. The mixture was then poured into a mixture of 30 ml. of water and 15 ml. of methanol, and the pH was brought to 3.5 with the aid of ammonium bicarbonate. After about 20 hours' storage at 5° C., the precipitate was filtered off, washed with acetone-water (1:1) methylene chloride and acetone, and dried to obtain 0.73 g. (84% yield) of 7-amino-cephalosporanic acid.

EXAMPLE IV 2.23 g. of the N-ethyl-piperidine salt of N-phenacetyl-3-desacetoxy-7-aminocephalosporanic acid were suspended in 18 ml. of methylene chloride, and after addition of 1.3 ml. of dimethylaniline, 1 ml. of trimethylchlorosilane was added thereto to form the corresponding trimethylsilyl ester. After 1 hour, the mixture was cooled to −50° C. and 1.1 g. of $PCl_5$ were added. For 2¼ hours the temperature was held at −40° C. and then lowered to −65° C. A solution of 0.3 ml. of dimethylaniline and 12 ml. of butanol was added to the cooled mixture and then the temperature was held for 2¼ hours at −40° C. The reaction mixture was poured into a mixture of 35 ml. of water and 17 ml. of methanol, and brought at once to a pH of 3.5 with the aid of ammonium bicarbonate. After about 20 hours' storage at 5° C., the precipitate was filtered off, washed with methanol-water (1:1), methylene chloride and acetone, and dried to obtain 0.936 gm. (92% yield) of desacetoxy-7-aminocephalosporanic acid.

EXAMPLE V

To demonstrate the critical influence of temperature in the imino ether step, the following example was conducted with a series of tests wherein the only variable was the imino ether formation temperature.

30 gm. of crude potassium salt of penicillin G assaying 1565 U/mg. were suspended in 125 ml. of dichloromethane in a 3-necked round bottom flask equipped with a stirrer and a thermometer. 8 ml. of dimethyl dichlorosilane and 21 ml. of N,N-dimethylaniline were added thereto with vigorous stirring during which the temperature rose to about +30° C. and the mixture was then stirred at +25° C. for half an hour. The mixture was then cooled to −52° C. and 18 gm. of phosphorus pentachloride were added thereto during which the temperature rose to −40° C. where it was held for two hours.

For the reaction with the n-butanol to form the corresponding butyl ether, the reaction mixture was cooled to a temperature 20° C. below the reaction temperature and then 4 ml. of dimethylaniline and 125 ml. of n-butanol were added thereto over one minute with vigorous stirring and cooling. If the temperature for the reaction was to be −60° C., the reaction mixture was cooled to −80° C. and the butanol was cooled to about −50° C. The reaction time was quite short at −10° and −20° C. and some experience was required to keep the reaction temperature at the proper temperature.

50 ml. fractions of the reaction mixture were taken at varying times depending upon the selected reaction temperature and were added to 20 ml. of distilled water with stirring. The pH of the aqueous mixture was adjusted to 4.0 by addition of 8.5 ml. of 6 N ammonium hydroxide and then ammonium bicarbonate. The 6-aminopenicillanic acid precipitated was recovered by vacuum filtration and was washed with a 50:50 mixture of water and acetone and then acetone. The time for selecting the samples was chosen so sampling began shortly before the optimum yield. The results are shown in Table II.

TABLE II

| Reaction temp. in butanol step (° C.) | Percent yield after minutes of reaction | | | |
|---|---|---|---|---|
| −10 | 73.8 (2 min.) | 80.0 (3½ min.) | 81.7 (5 min.) | 79.8 (7½ min.). |
| −20 | 83.0 (5 min.) | 85.1 (10 min.) | 86.5 (15 min.) | 85.0 (20 min.). |
| −30 | 86.3 (15 min.) | 88.4 (30 min.) | 88.2 (45 min.) | 87.6 (60 min.). |
| −40 | 87.7 (30 min.) | 90.5 (60 min.) | 90.6 (90 min.) | 89.8 (120 min.). |
| −50 | 88.0 (90 min.) | 90.6 (120 min.) | 90.3 (150 min.) | 89.9 (180 min.). |
| −60 | 89.9 (300 min.) | 90.5 (330 min.) | 91.2 (360 min.) | 90.9 (390 min.). |

The mother liquors still contained 6-amino-penicillanic acid in an amount of 3.5 to 4.5%.

Table II clearly shows that temperatures of −20 to −60° C. are required in the imino ether formation step to obtain yields of 85 to 95%, which is a 50% reduction of loss of product when using temperatures of 0° to −10° C. which is completely unexpected and extremely valuable in a commercial process.

EXAMPLE VI

In a 1 liter 4-necked round bottom flask equipped with an efficient stirrer, a thermometer, a dropping funnel and a $CaCl_2$-tube, 60 g. of crude milled potassium salt of penicillin G (purity about 98%) was suspended in a mixture of 250 ml. of methylene chloride and 43 ml. of N,N-dimethylaniline. The flask was cooled by water and to the suspension in the flask, 16 ml. of dimethyl dichlorosilane was added via the dropping funnel within 5 minutes, so that the temperature did not rise above 27° C. The mixture was stirred another 30 minutes at about 25° C. and then cooled to −50° C. by means of Dry Ice-acetone. When this temperature was reached, 36 g. of phosphorus pentachloride was added all at once whereby the temperature rose to about −40° C. and this temperature was maintained for 2 hours while stirring, whereafter the reaction mixture was cooled to −65° C. Then 8.5 ml. of N,N-dimethylaniline and 250 ml. of n-butanol were added within about 5 minutes. To avoid raising the temperature above −40° C., the mixture was cooled sufficiently, especially during the beginning of the addition of the butanol. The mixture must be stirred vigorously. The temperature of −40° C. was then maintained during 2 hours and 30 minutes. The cooling bath was removed and while stirring intensively 240 ml. of distilled water and then 100 ml. of 4.5 N ammonia were added, both within a few minutes. Before the end of the addition of ammonia, the mixture was inoculated with about 100 mg. of 6-amino-penicillanic acid. The temperature was between +5 and +10° C. Ammonium bicarbonate was slowly added over about a half hour until a pH of 4.1 was reached (about 35 g. $NH_4HCO_3$). After cooling the mixture for 6 hours at about +5° C., it was filtered and the filter cake of 6-amino-penicillanic acid crystals was washed with 50 ml. of an acetone-water mixture (1:1) and then with 50 ml. acetone. After drying, the yield of 6-amino-penicillanic acid was 31–32 g. with a purity of 97–99%, corresponding to 91% theoretical yield.

EXAMPLE VII 29.8 g. of the potassium salt of benzyl penicillin (technical grade, 1579 U/mg.) were suspended in 300 ml. of technical chloroform. Then, in succession, 32 ml. of quinoline and 14.5 ml. of dimethyldichlorosilane were added to the suspension. The temperature rose from 20.5° C. to 26° C. After stirring for about 40 minutes the suspension was cooled to −25° C. At this temperature 18 g. of $PCl_5$ were added. After a reaction period of 3 hours, 200 ml. of n-propanol were added quickly (about 4 minutes) under vigorous stirring, but in such a way that the temperature did not rise above −20° C. After a reaction period of 2 hours, the reaction mixture was added to 175 ml. of water under stirring and the pH was brought to 4.0 by means of ammonium bicarbonate. After standing during 12 hours at 4° C., the 6-amino penicillanic acid was filtered off and washed with 65 ml. of 50% cold methanol and 70 ml. of acetone. After drying, 13.85 g. (80.1% yield) of 6-amino penicillanic acid having a content of 2702 U/mg. were obtained.

EXAMPLE VIII

In a three-necked flask equipped with a stirrer, a dropping funnel, a thermometer and a calcium chloride tube, 14 g. of techniual grade penicillin V acid were dissolved in 140 ml. of dry, alcohol-free chloroform, and 6.4 ml. of triethylamine and 6 ml. of trimethylchlorosilane were added. The temperature rose to about 30° C. After 15 minutes, 19 ml. of pyridine were added and after cooling to −10° C., a solution of 12.5 g. of $PCl_5$ in 260 ml. of anhydrous, alcohol-free chloroform was added dropwise over about 7 minutes. Cooling was required to prevent the temperature of the mixture rising above 0° C. After 45 minutes stirring at about 0° C. (−1°−+2° C.), the mixture was cooled again to −10° C. and then 130 ml. of absolute methanol were added dropwise over 5 minutes in such a way that the temperature did not rise above 0° C.

After a reaction time of 120 minutes, 40 ml. of distilled water were added to the reaction mixture and the pH was brought to 2.0 with the aid of 6 N ammonium hydroxide. After 3 hours' standing at about 5° C., the pH was brought to 4.0 with the aid of 6 N ammonium hydroxide. The next morning, the crystallized 6-aminopenicillanic acid was sucked off from the mixture, which has been stored in the ice-box, was washed with 60% and 100% methanol and dried, to obtain 3.64 g. of 6-aminopenicillanic acid (i.e., yield of 42.1%). According to microbiological estimation, the mother liquor still contained 4.9% of 6-aminopenicillanic acid.

EXAMPLE IX 14.88 g. of the potassium salt of penicillin G, suspended in 140 ml. of chloroform, were converted with 6.9 ml. of trimethylchlorosilane into the trimethylsilyl ester (reaction time 92 minutes at 23–25° C.). After this, 13.6 ml. of pyridine were added and the mixture was cooled to −10° C. By addition of 9 g. of $PCl_5$ in 185 ml. of chloroform over about 1½ minutes, the temperature rose to 0° C. After 33 minutes stirring at 0° C. and cooling to −11° C., 100 ml. of absolute methanol were added over about 4 minutes during which the temperature rose again to 0° C. After a reaction time of 159 minutes at this temperature, the mixture was added to 40 ml. of distilled water and the pH was brought at once to 4.0 by means of 6 N NaOH. After 20 hours' storage at about 5° C., the precipitate was sucked off, washed with cold 60% and 100% methanol and dried, to obtain 4.52 g. of 6-aminopenicillanic acid (yield of 52.2%) having a pale yellow color. According to the estimations, the mother liquor still contained 6.2% of 6-aminopenicillanic acid. According to the biological estimation, the purity of the precipitate was 97.5% and according to the chemical analysis, it was 98.3%. The IR spectrum and the $R_F$ values obtained in chromatography corresponded to those of authentic 6-aminopenicillanic acid.

EXAMPLE X 29.76 g. of the potassium salt of penicillin G were converted in 50 ml. of pure chloroform to which 9.2 ml. of pyridine had been added with 14 ml. of trimethylchlorosilane into the trimethylsilyl ester. After cooling of the solution to −30° C., in about 1 minute a solution of 18 g. of $PCl_5$ in 150 ml. of pure chloroform was added, during which the temperature rose to −1° C. With continued stirring, the reaction mixture was maintained for 20 minutes at a temperature of 0° C. and then it was cooled to −20° C. and a mixture of 150 ml. of absolute ethanol and 18.4 ml. of pyridine was added, viz., two-thirds of the quantity in 3 minutes, the remainder in 1 hour, while the temperature was maintained at about 0° C. After another 20 minutes' stirring at 0° C., the reaction mixture was added with stirring to a solution of 33 g. of sodium acetate trihydrate in 100 ml. of water. The pH of the mixture was brought from 3.8 to 3.95 with 6 N NaOH. After 19 hours standing at about 5° C., the precipitate was drawn off, washed and dried to obtain 7.28 g. of 6-aminopenicillanic acid, yield of 42.1%. According to analysis, the mother liquor still contained 5.9% of 6-aminopenicillanic acid and 1.4% of penicillin G.

EXAMPLE XI 14.88 g. of the potassium salt of penicillin G, suspended in 140 ml. of pure chloroform, was converted with 6.4 ml. of trimethylchlorosilane into the trimethylsilyl ester (75 minutes at 23–25° C.). After this, 13.2 ml. of pyridine were added, the mixture was cooled to −18° C., and over 3 minutes a solution of 9 g. of $PCl_5$ in 185 ml. of pure chloroform was added dropwise, during which the temperature rose to −3° C. After 32 minutes stirring at 0° C. and cooling again to −23° C., 100 ml. of n-propanol were added. After a reaction time of 197 minutes at 0° C. and another 128 minutes at 7–9° C., 21 ml. of water were added and the pH was brought to 3.95. After 6 hours' standing at 4° C., the 6-aminopenicillanic acid was sucked off, washed and dried, to obtain 2.58 g. of 6-aminopenicillanic acid (29.8% yield). After working-up, the mother liquor was still found to contain 4.9% of 6-aminopenicillanic acid and 0.6% of benzyl-penicillin.

EXAMPLE XII

The trimethylsilyl ester of benzylpenicillin, prepared from 14.88 g. of the potassium salt of benzylpenicillinate and 6.4 ml. of trimethylchlorosilane in 140 ml. of pure chloroform, to which 13.2 ml. of pyridine had been added, was converted, after cooling to −18° C. with 9 g. of $PCl_5$ in 185 ml. of pure chloroform. In consequence, the temperature rose to almost 0° C. After a reaction time of 32 minutes at 0° C., the mixture was cooled again (to −20° C.), upon which 100 ml. of n-butanol was added. The mixture was stirred for 140 minutes at 0° C., for 85 minutes at 5° C. and for 73 minutes at 12–20° C. After this, 21 ml. of distilled water were added with continued stirring and the pH was brought to 3.95. After 4 hours' standing at 4° C., the precipitate was sucked off, washed and dried, to obtain 2.89 g. of 6-aminopenicillanic acid (yield of 33.5%). The mother liquor still contained 4.4% of 6-aminopenicillanic acid and 0.7 g. of benzylpenicillin.

EXAMPLE XIII

Using the procedure of Example VIII, the trimethylsilyl ester of penicillin G was converted with $PCl_5$. This time, however, the cooled reaction mixture was converted further with 125 ml. of amyl alcohol instead of n-butanol. This reaction was carried out first at 0° C. (148 minutes), then at +5° C. (63 minutes) and finally at +10 to 15° C. (95 minutes). The product obtained was 2.78 g. of 6-aminopenicillanic acid (yield of 32.2%). The mother liquor still contained 5.4% of 6-aminopenicillanic acid.

EXAMPLE XIV

A suspension of 14.88 g. of the potassium salt of benzylpenicillin in 50 ml. of pure methylene chloride was converted in the presence of 6.8 ml. of pyridine with 6.4 ml. of trimethylchlorosilane into the trimethylsilyl ester. To the solution cooled to −25° C. there was added all at once a solution of 9 g. of $PCl_5$ in 100 ml. of pure methylene chloride, during which the temperature rose to −3° C. The reaction mixture was now stirred for another 12 minutes at 0° C. and subsequently cooled to −30° C. At this temperature, a mixture of 6.8 g. of pyridine and 100 ml. of methanol was added during which the temperature rose to 0° C. After 125 minutes, 40 ml. of distilled water were added and the pH was brought to 4.0. After 24 hours' standing at 5° C., the crystallized 6-aminopenicillanic acid was vacuum filtered, washed and dried, to obtain 3.48 g. of 6-aminopenicillanic acid (yield of 40.3%) while the mother liquor still contained 3.3% of it.

EXAMPLE XV 7.44 g. of the potassium salt of penicillin G were suspended in 25 ml. of pure methylene chloride and to the suspension 1.6 ml. of pyridine and 6.4 ml. of trimethylchlorosilane were added. After cooling to 20° C., 1.9 ml. of phosphorous oxychloride in 25 ml. of pure methylene chloride were added dropwise to the trimethylsilyl ester formed, and the temperature was brought to room temperature (about 26° C.). At this temperature, the mixture was stirred for 3¾ hours. It was then cooled to −20° C., and with continued stirring first 25 ml. of methanol and subsequently a mixture of 25 ml. of methanol and 4.0 ml. of pyridine were added. After 115 minutes stirring at 0° C., 20 ml. of distilled water were added and the pH of the mixture was brought to 7.3. The layers were separated and the methylene chloride layer was further extracted with 5 ml. of distilled water. According to the microbiological estimation, the aqueous layers thus obtained contained 6-aminopencillanic acid.

EXAMPLE XVI 7.45 g. of potassium benzylpenicillinate were suspended in 80 ml. of dry alcohol-free chloroform and with stirring and passing-over of nitrogen gas, 2.6 ml. of trimethylchlorosilane were added to the suspension. After 30 minutes' stirring at room temperature, during which a solution was formed, 2 g. of triethyloxonium tetrafluoroborate in 17 ml. of chloroform were added. After 2½ hours' stirring at room temperature, 40 ml. of pyridine were added. 13.5 ml. of the reaction mixture was subsequently evaporated to dryness under a pressure of 25 cm. Hg at a temperature of 30 C°. The residue was taken up in 200 ml. of dioxane. Then 120 ml. of 5% phosphoric acid were added dropwise. After 3½ hours' standing at room temperature, with the aid of chromotography, the presence of 6-aminopenicillanic acid can be shown in the mixture. The microbiological test too points to the presence of 6-aminopencillanic acid.

Various modifications of the process may be made without departing from the spirit or scope thereof.

We claim:

1. A process for the production of 6-aminopenicillanic acid which comprises (A) reacting an acylamino acid compound of the formula

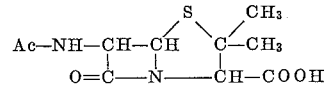

wherein Ac is the acyl of an organic carboxylic acid of 1 to 18 carbon atoms, salts thereof with a silyl compound of a formula selected from the group consisting of

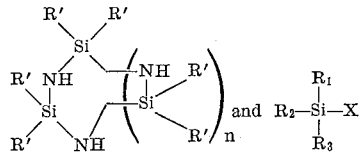

wherein $R_1$, $R_2$ and $R_3$ are selected from the group consisting of hydrogen, halogen, alkyl and haloalkyl of 1 to 7 carbon atoms, phenyl, benzyl, tolyl and dimethylaminophenyl, at least one of the said R's being other than halogen and hydrogen, R' is alkyl of 1 to 7 carbon atoms, n is an integer from 1 to 2 and X is selected from the group consisting of halogen and

and $R_4$ is selected from the group consisting of hydrogen and alkyl of 1 to 7 carbon atoms and $R_5$ is selected from the group consisting of hydrogen, alkyl of 1 to 7 carbon atoms and

to form the corresponding silyl ester of the said acylamino acid, (B) reacting the said silyl ester under anhydrous conditions with an acid halide as a halogenating agent at a temperature below about 0 C. to form the corresponding imino halide, (C) reacting the said imino halide at a temperature not greater than −20° C. with an alcohol of the formula $R_6OH$ wherein $R_6$ is selected from the group consisting of alkyl of 1 to 12 carbon atoms, phenylalkyl of 1 to 7 alkyl carbon atoms, cyclohexyl, hydroxyalkyl of 2 to 12 carbon atoms, alkoxyalkyl of 3 to 13 carbon atoms, monocyclic aryloxyalkyl of 2 to 7 alkyl carbons; monocyclic aralkoxyalkyl of 3 to 7 alkyl carbons, and hydroxy-alkoxyalkyl of 4 to 7 carbon atoms to form the corresponding imino ether and (D) reacting the imino ether under acid conditions with a compound selected from the group consisting of water and a hydroxyl containing compound to form 6-aminopenicillanic acid.

2. A process for the production of 6-aminopenicillanic acid which comprises (A) reacting a compound selected from the group consisting of a biosynthetic penicillin and a salt thereof with a silyl compound of a formula selected from the group consisting of

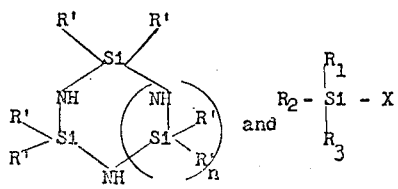

wherein $R_1$, $R_2$ and $R_3$ are selected from the group consisting of hydrogen, halogen, alkyl and haloalkyl of 1 to 7 carbon atoms, phenyl benzyl, dimethylaminophenyl and tolyl, at least one of the said R's being other than halogen and hydrogen, R' is alkyl of 1 to 7 carbon atoms, $n$ is an integer from 1 to 2 and X is selected from the group consisting of halogen and

and $R_4$ is selected from the group consisting of hydrogen and alkyl of 1 to 7 carbon atoms and $R_5$ is selected from the group consisting of hydrogen, alkyl of 1 to 7 carbon atoms and

to form the coresponding silyl ester of the said acylamino acid, (B) reacting the said silyl ester under anhydrous conditions with an acid halide as a halogenating agent at a temperature below about 0° C. to form the corresponding imino halide, (C) reacting the said imino halide at a temperature not greater than −20° C. with an alcohol of the formula $R_6OH$ wherein $R_6$ is selected from the group consisting of alkyl of 1 to 12 carbon atoms, phenylalkyl of 1 to 7 alkyl carbon atoms, cyclohexyl, hydroxyalkyl of 2 to 12 carbon atoms, alkoxyalkyl of 3 to 13 carbon atoms, monocyclic aryloxyalkyl of 2 to 7 alkyl carbons; monocyclic aralkoxyalkyl of 3 to 7 alkyl carbons and hydroxyalkoxyalkyl of 4 to 7 carbon atoms to form the corresponding imino ether and (D) reacting the imino ether under acid conditions with water to form 6-aminopenicillanic acid.

3. The process of claim 2 wherein the acylamino acid compound is selected from the group consisting of penicillin G and penicillin V.

4. The process of claim 3 wherein the acid halide is selected from the group consisting of phosphorus pentachloride, phosphorus pentabromide, phosphorus tribromide and phosphorus oxychloride.

5. The process of claim 4 wherein the acid halide is phosphorus pentachloride.

6. The process of claim 4 wherein the silyl compound is selected from the group consisting of dimethyl dichlorosilane, trimethyl chlorosilane and methyl trichlorosilane.

7. The process of claim 4 wherein the silyl ester is reacted with the acid halide at a temperature from about −10° to about −40° C.

8. The process of claim 4 wherein the imino halide is reacted with the alcohol at a temperature of about −40° C.

9. The process of claim 4 wherein the alcohol is selected from the group consisting of n-butanol and methanol.

10. The process of claim 5 wherein the silyl compound is selected from the group consisting of dimethyl dichlorosilane, trimethyl chlorosilane and methyl trichlorosilane and wherein the silyl ester is reacted with the acid halide at a temperature of about −10° C. to −40° C. and wherein the imino halide is reacted with the alcohol at a temperature of about 40° C. and wherein the alcohol is selected from the group consisting of n-butanol and methanol.

References Cited

UNITED STATES PATENTS

| | | | |
|---|---|---|---|
| 3,234,223 | 2/1966 | Fechtig et al. | 260—243 |
| 3,249,622 | 5/1966 | Herrling et al. | 260—239.1 |

FOREIGN PATENTS

| | | | |
|---|---|---|---|
| 957,570 | 5/1964 | Great Britain. | |

NICHOLAS S. RIZZO, Primary Examiner

U.S. Cl. X.R.

260—239.1, 243

104 052-1 CAM/mjc

PO-1050
(5/69)

UNITED STATES PATENT OFFICE
CERTIFICATE OF CORRECTION

Patent No. 3499909          Dated March 10, 1970

Inventor(s) HELMUT WILHELM OTTO WEISSENBURGER and MARCELUS GIJSBERTUS van der HOEVEN It is certified that error appears in the above-identified patent and that said Letters Patent are hereby corrected as shown below:

Column 3, line 40 - In the formula, "$R_3$" should read --$R_4$-- line 53 - "amino" should read --imino--

Column 5, line 12 - Correct spelling of "excess"

line 50   "C" should read --C--

"C"          --O-- line 55   Same

Column 6, line 6 - Correct spelling of "cephalosporanic"

Column 12, line 47 - After "0" insert degree sign

Column 14, line 26 - "40°C" should read -- -40°C--

SIGNED AND
SEALED
DEC 8 1970

(SEAL)
Attest:

Edward M. Fletcher, Jr.
Attesting Officer

WILLIAM E. SCHUYLER, JR.
Commissioner of Patents